(12) United States Patent
Foster et al.

(10) Patent No.: US 7,083,041 B1
(45) Date of Patent: Aug. 1, 2006

(54) SLAT CONVEYOR HAVING CONVEYING SLATS AND LIFTING SLATS

(75) Inventors: Raymond Keith Foster, Madras, OR (US); Kenneth A. Stout, Madras, OR (US); Scott Michael Delamarter, Tacoma, WA (US)

(73) Assignee: Keith Investments, LLC, Madras, OR (US)

( * ) Notice: Subject to any disclaimer, the term of this patent is extended or adjusted under 35 U.S.C. 154(b) by 0 days.

(21) Appl. No.: 11/334,978

(22) Filed: Jan. 18, 2006

(51) Int. Cl.
*B65G 25/04* (2006.01)

(52) U.S. Cl. .............................. 198/750.14; 198/750.2; 198/750.1

(58) Field of Classification Search ............. 198/750.2, 198/750.14, 750.1, 750.3, 750.4; 242/571.1; 264/36.17
See application file for complete search history.

(56) References Cited

U.S. PATENT DOCUMENTS

| | | | | |
|---|---|---|---|---|
| 4,741,657 A | * | 5/1988 | Cassel | 414/267 |
| 5,588,522 A | * | 12/1996 | Foster et al. | 198/775 |
| 5,664,663 A | * | 9/1997 | Wilkens | 198/750.1 |
| 6,213,287 B1 | * | 4/2001 | Juracko | 198/499 |
| 6,637,586 B1 | * | 10/2003 | Kuecker et al. | 198/774.2 |

\* cited by examiner

*Primary Examiner*—Gene O. Crawford
*Assistant Examiner*—Ramya G. Prakasam
(74) *Attorney, Agent, or Firm*—Delbert J. Barnard

(57) ABSTRACT

An inflatable bladder (50) is positioned between the top (24) of a lower slat (22) and the top (36) of an upper slat (20). An air supply/exhaust conduit (52) extends upwardly from a transverse manifold (76) to the inflatable bladders (50). Flanges (32, 34) on the lower slat (22) contact flanges (42, 44) on the upper slat (20) to stop upward movement of the upper slat (20).

17 Claims, 8 Drawing Sheets

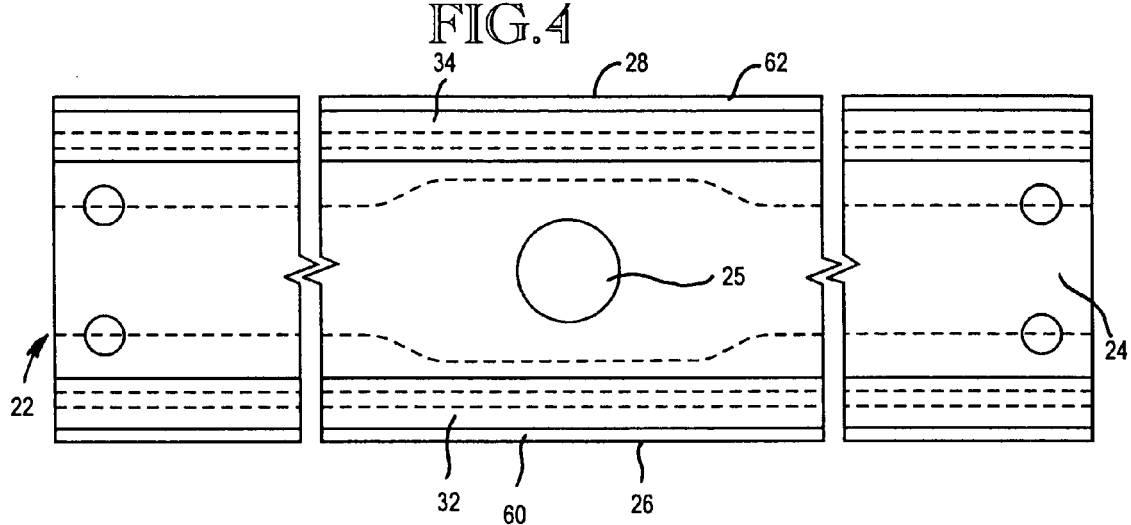
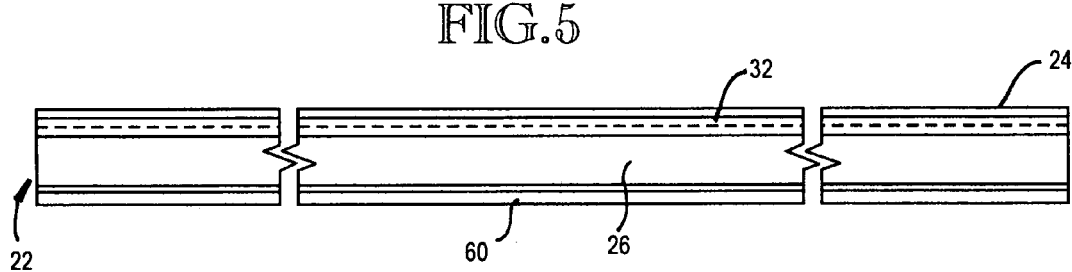
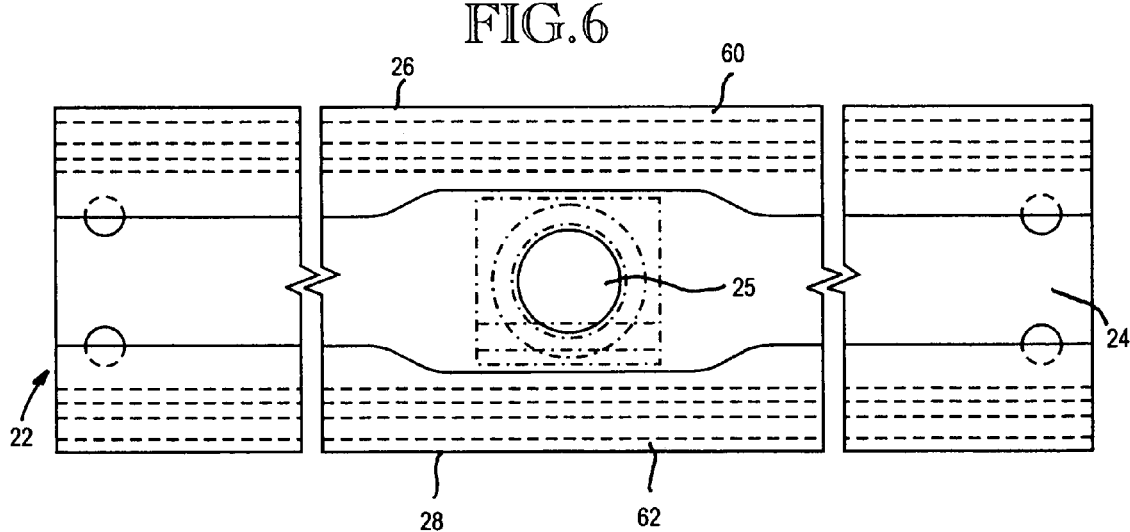

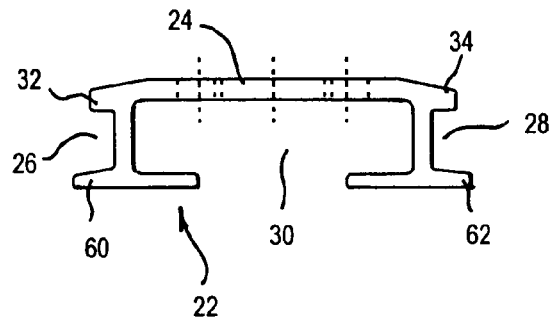
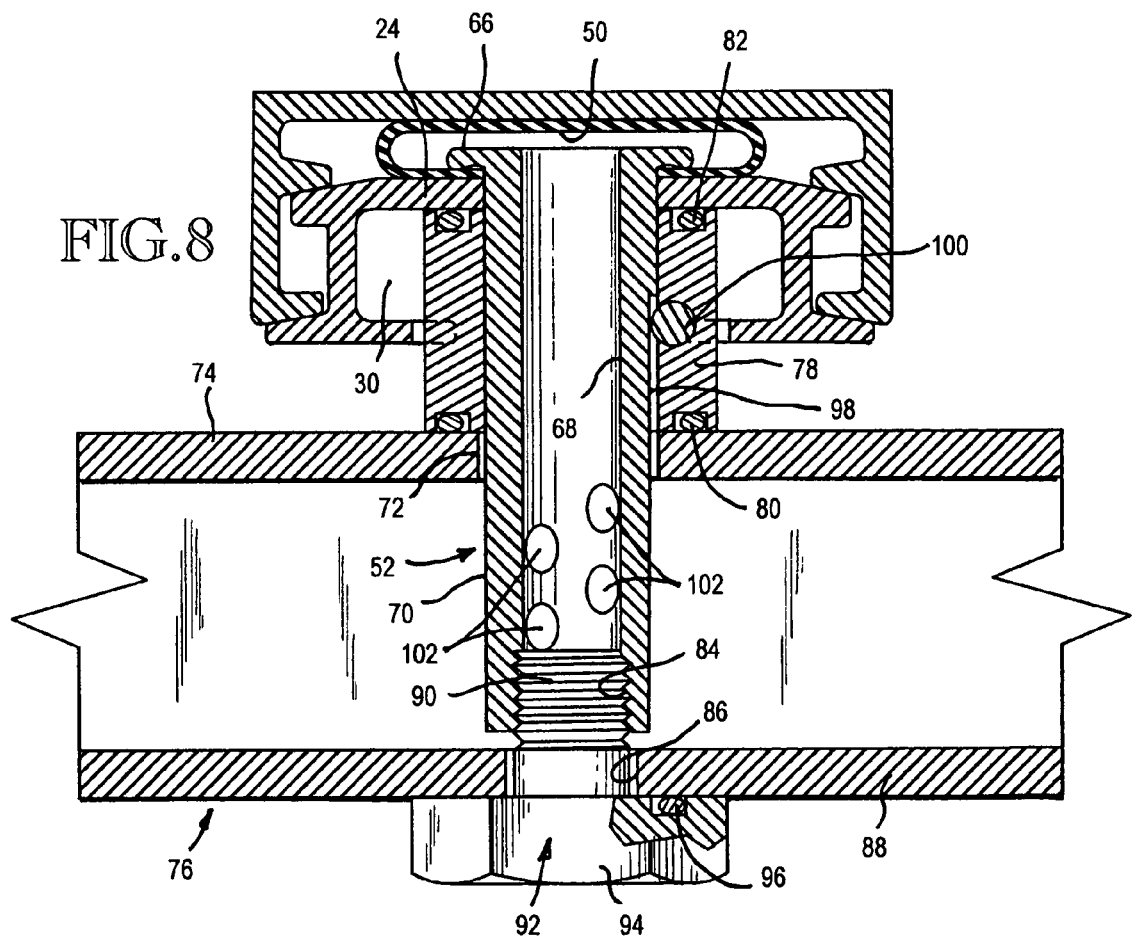

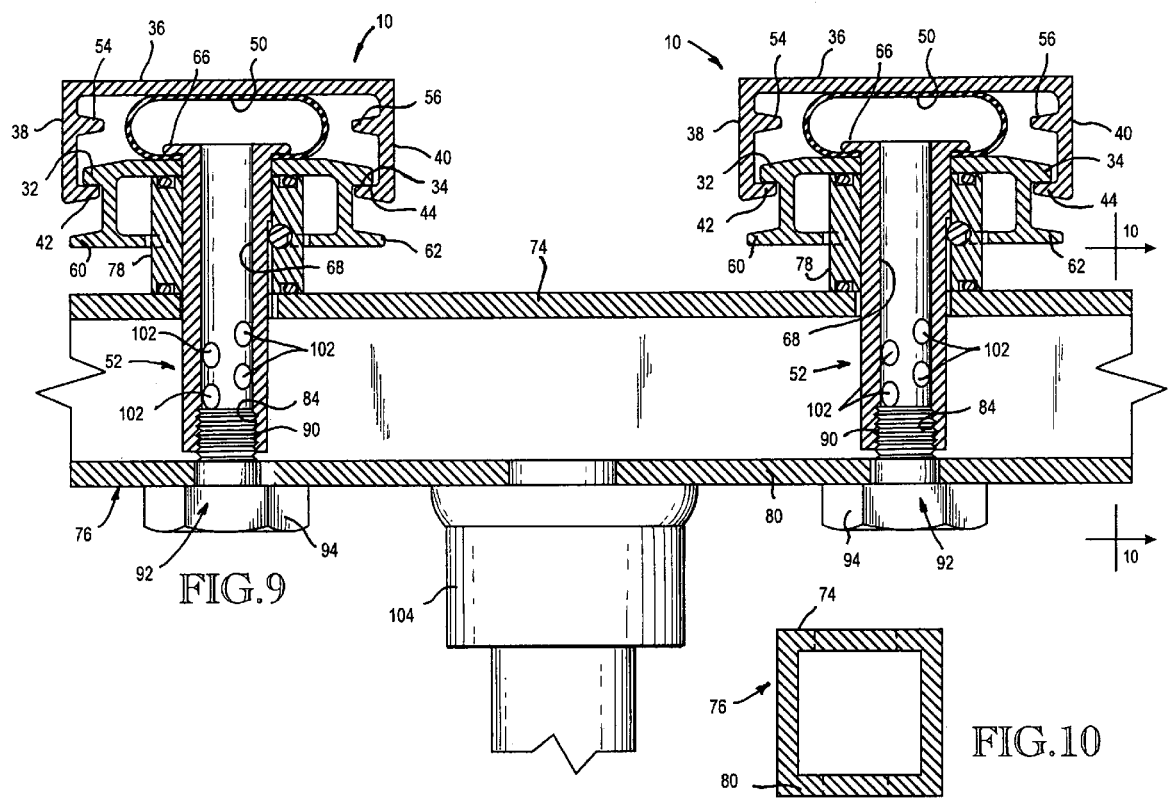

SLAT CONVEYOR HAVING CONVEYING SLATS AND LIFTING SLATS

TECHNICAL FIELD

This invention relates to reciprocating slat conveyors of the type having a set of movable slats for conveying a load and a set of lifting slats for lifting and holding the load while the movable slats retract.

BACKGROUND OF THE INVENTION

The background technology for the present invention is disclosed in my U.S. Pat. No. 5,588,522, granted Dec. 31, 1996, and in my U.S. Pat. No. 6,439,375, granted Aug. 27, 2002. The disclosures of these patents are incorporated herein.

There is a need for an improved lifting slat construction that will facilitate the manufacture and installation of the lifting slats. The principal object of the present invention is to fill this need.

BRIEF SUMMARY OF THE INVENTION

The lifting slat of the present invention is characterized by a fixed lower slat and a vertically movable upper slat positioned above the fixed lower slat. The fixed lower slat includes a top and a pair of opposite side portions that depend from the top and define a bottom space between them. The side portions include laterally outwardly projecting first flanges. The vertically movable upper slat includes a top and laterally spaced apart side portions depending from the top and defining a space between them in which the lower slat is received. The side portions of the upper slat include laterally inwardly projecting second flanges. The upper slat is movable vertically between a lowered position in which the second flanges are below and are vertically spaced from the first flanges, and a raised position in which the second flanges contact the first flanges and stop upward movement of the upper slat.

An inflatable bladder is positioned between the top of the lower slat and the top of the upper slat. An air supply/exhaust conduit extends upwardly through the lower slat, and through an opening in the top of the lower slat, and connects with the inflatable bladder. Air delivered through the air supply/exhaust conduit into the bladder will inflate the bladder and push the upper slat upwardly until the first flanges contact the second flanges. Removal of air from the bladder through the air supply/exhaust conduit will allow the upper slat to drop downwardly relative to the lower slat.

In preferred form, the upper slat includes laterally inwardly projecting third flanges that are situated above both the first flanges and the second flanges. When the upper slat is in its lowered position, the third flanges sit down on the second flanges. Preferably also, the lower slat includes laterally outwardly projecting fourth flanges below the third flanges. When the upper slat is in its lowered position, the third flanges sit down onto the fourth flanges.

According to another aspect of the invention, a tubular manifold extends sideways of the conveyor below the lower slats. The supply/exhaust conduit is at its lower end connected to the manifold. The slat conveyor may include a tubular spacer having a lower end in contact with the manifold and an upper end in contact with the top of the lower slat. The air supply/exhaust conduit extends upwardly from within the manifold, through the tubular spacer and into the inflatable bladder. The air supply/exhaust conduit may include an upper end having a laterally outwardly projecting flange. This flange is located within the inflatable bladder and includes a lower surface that contacts a portion of the bladder that surrounds the air supply/exhaust conduit.

The air supply/exhaust conduit may include an internally threaded lower end portion. A retaining bolt may extend upwardly through an opening in a lower wall of the manifold and screw into the threaded lower end portion of the air supply/exhaust conduit. A tightening of the retaining bolt pulled to the flange at the top of the air supply/exhaust conduit and the tight sealing engagement with the region of the inflatable bladder that surrounds the air supply/exhaust conduit. The air supply/exhaust conduit may have a tubular lower portion located within the manifold. This tubular lower portion may include a sidewall having openings which communicate the interior of the air supply/exhaust conduit with the interior of the manifold.

These and other objects, advantages, and features of the present invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWINGS

Like reference numerals are used to designate like parts throughout the several views of the drawing, and:

FIG. 4 is a top plan view of a fixed lower slat, cut away at two locations between its ends for the purpose of shortening the view;

FIG. 5 is a side elevational view of FIG. 4;

FIG. 6 is a bottom plan view of FIGS. 4 and 5;

FIG. 7 is an end view of FIG. 5;

FIG. 8 is a fragmentary sectional view taken in the vicinity of an air supply/exhaust conduit having a lower end within a manifold and an upper end connected to an inflatable bladder, such view showing the lifting slat in a "down" position;

FIG. 9 is a view generally like FIG. 8 but showing two lifting slats, such view showing the lifting slats in the "up" positions;

FIG. 10 is a cross sectional view taken substantially along line 10—10 of FIG. 9;

DETAILED DESCRIPTION OF THE ILLUSTRATED EMBODIMENT

Figure 1:
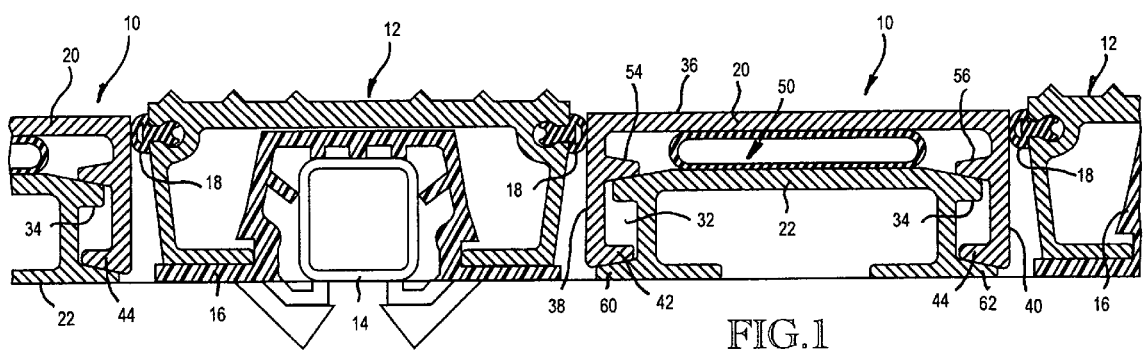
FIG. 1 is a fragmentary sectional view through a full conveying slat, a portion of a second conveying slat, a full lifting slat, and a portion of a second lifting slat, such view showing the lifting slats in a "down" position.
Figure 2:
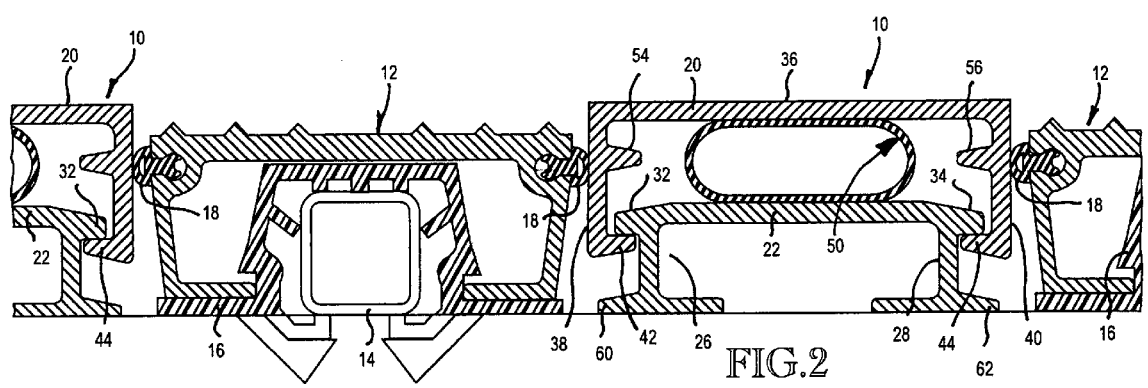
FIG. 2 is a view like FIG. 1 but showing the lifting slats in an "up" position.

FIGS. 1 and 2 show lifting slats 10 and conveying slats 12. The conveying slats 12 are constructed in the manner disclosed in my aforementioned U.S. Pat. No. 5,588,522, and in my U.S. Pat. No. 4,896,761, granted Jan. 30, 1990, and entitled Reciprocating Conveyor Floor Members and Seals, and my U.S. Pat. No. 4,679,686, granted Jul. 14, 1987, and entitled Bearing System for Reciprocating Floor Conveyor. U.S. Pat. Nos. 4,896,761 and 4,679,686 disclose in detail the mounting arrangement for slideably securing conveyor slats 12 to a support frame. The support frame includes a guide/support beam 14 for each conveyor slat 12. A series of bearings 16 snap down onto the beams 14. Seal strips 18 are held in grooves formed in the sidewalls of the conveying slats 12 and extend laterally outwardly to engage side surfaces of the adjacent lifting slats 10.

Figure 3:
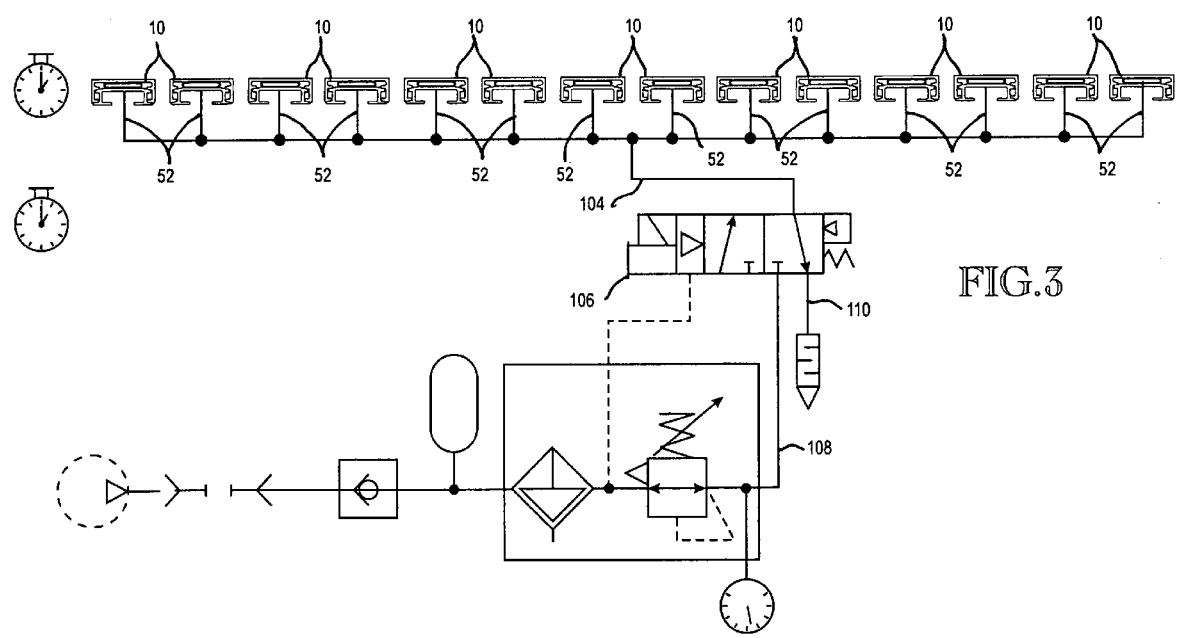
FIG. 3 is a schematic diagram of a fluid supply and control system for lifting and lowering the lifting slats.
Figure 11:
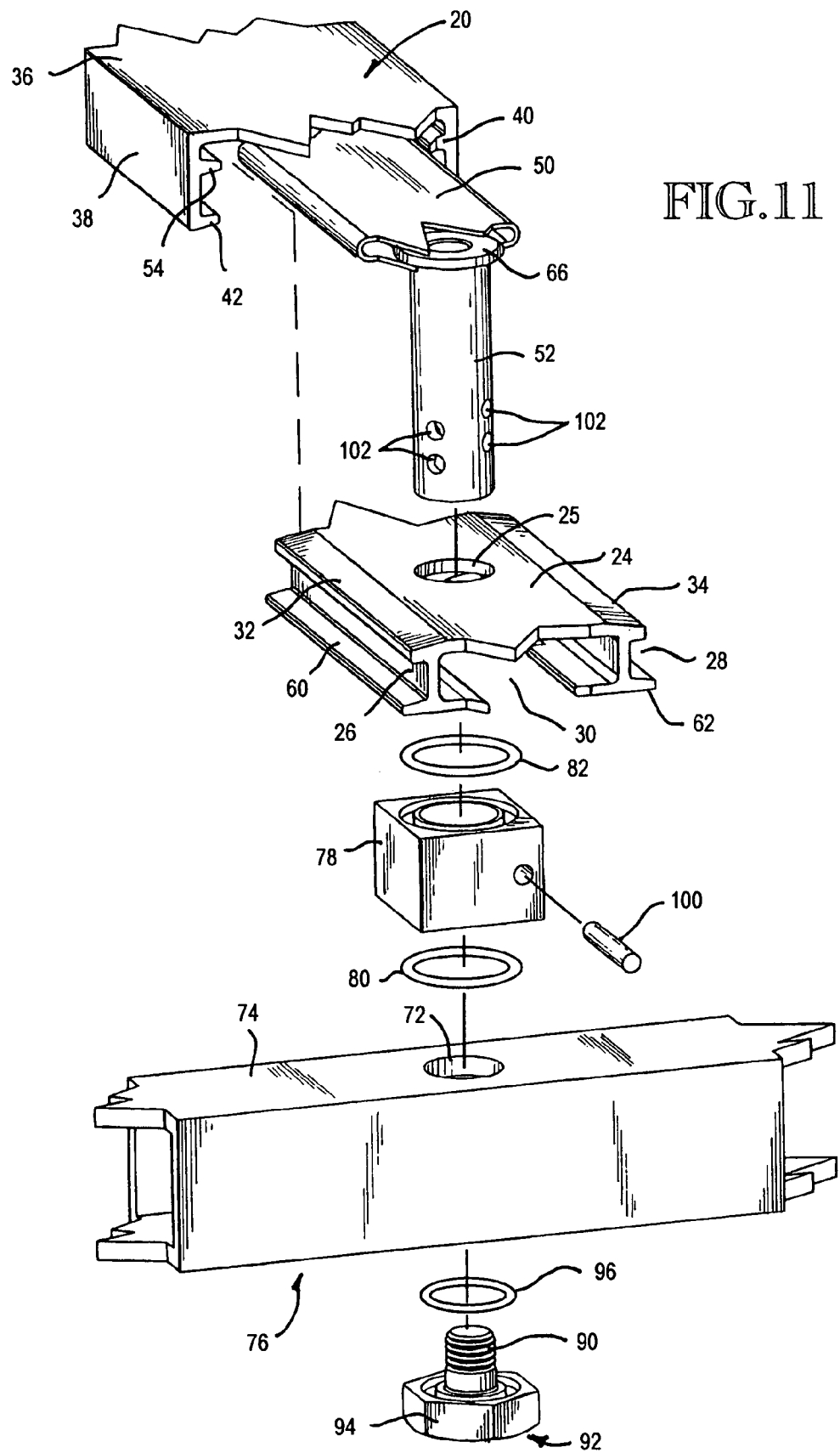
FIG. 11 is a fragmentary pictorial view of some of the components shown in FIG. 9, such view being taken from above and looking towards the top and one side of the air manifold, the fixed lower slat and the movable upper slat.
Figure 12:
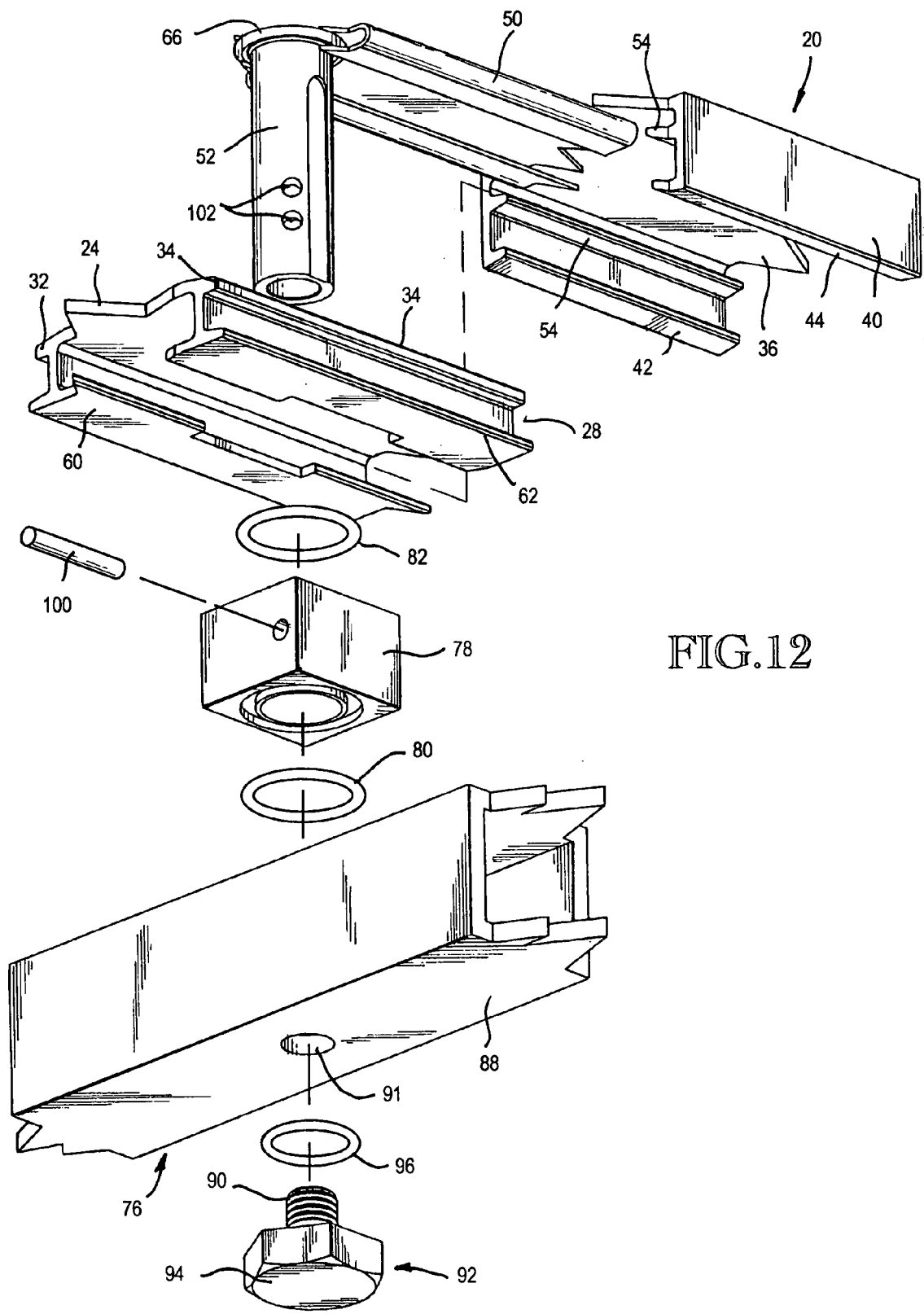
FIG. 12 is a view similar to FIG. 11, but looking down on the fixed lower slat, the vertically movable upper slat and the air manifold.

FIG. 3 shows the lifting slats 10 for a system that includes fourteen lifting slats 10 and either thirteen or fifteen conveying slats 12, depending on whether the two outside slats are lifting slats 10 or conveying slats 12. The conveying slats 12 are omitted from FIG. 3. If they were to be added to FIG. 3, they would be positioned between each pair of lifting slats 10 and possibly outside of the two outer most lifting slats 10. The arrangement of the lifting slats 10 to the conveying slats 12 is shown in FIGS. 1 and 2.

As shown in FIGS. 1, 2, 8 and 9, each lifting slat 10 comprises an upper slat (or upper portion) 20 and a lower slat (or lower portion) 22. Preferably, upper slat 20 is an extrusion and lower slat 22 is an extrusion. They may be extruded from an aluminum alloy, or a suitable substitute material, including a plastic resin material. As best shown by FIGS. 4–7, the lower slat 22 has a top 24 and a pair of opposite side portions 26, 28 depending from the top 24. The side portions 26, 28 define a bottom space 30 between them. The bottom slots 22 further include laterally outwardly projecting first flanges 32, 34. The vertically movable upper slat 20 includes a top 36 and laterally spaced apart side portions 38, 40 which depend from the top 36. The side portions 38, 40 define a space between them in which the lower slat 22 is situated (FIGS. 1, 2, 8 and 9). The side portions 38 of the upper slat 36 includes inwardly projecting second flanges 42, 44. As a comparison of FIGS. 1 and 2 will show, the upper slat 20 is movable vertically between a lowered position (FIG. 1) in which the second flanges 42, 44 are vertically spaced from the first flanges 32, 34 (FIG. 1) and a raised position in which the second flanges 42, 44 contact the first flanges 32, 34, such contact stopping any further upward movement of the upper slat 20 (FIG. 2).

An inflatable bladder 50 is positioned between the top 24 of the lower slat 22 and the top 36 of the upper slat 20. The bladder 50 extends lengthwise of the slats 20, 22 and is sealed at both ends. An air supply/exhaust conduit 52 is connected to each bladder 50. A preferred embodiment of the air supply/exhaust conduits 52 is shown in FIGS. 8, 9, 11 and 12. The conduits 52 are schematically in FIG. 3.

In the illustrated embodiment, the upper slat 20 includes laterally inwardly projecting third flanges 54, 56 that are situated above both the first flanges 32, 34 and the second flanges 42, 44. When the upper slat 20 is in its lowered position (FIG. 1), the third flanges 54, 56 set down on the first flanges 32, 34 (FIG. 1). The lower slat 22 may include laterally outwardly projecting fourth flanges 60, 62 below the second flanges 42, 44. When the upper slat is in its lowered position the second flanges 42, 44 set down on the fourth flanges 60, 62 (FIG. 1). Referring to FIGS. 8 and 9, the upper end of each air supply/exhaust conduit 52 includes a laterally outwardly projecting flange 66 on top of a tubular body 68 having an outside diameter below the flange 66 that fits through an opening formed in a bottom portion of the inflatable bladder 50. The lower portion 70 of the tubular body 68 extends downwardly through an opening 72 in the top 74 of a manifold 76. A tubular spacer 78 has a lower end that sets down on the upper wall 74 of the manifold 76. An O ring 80 is provided to prevent air leakage out from the manifold 76 and between the spacers 78 and the top wall 74 of the manifold 76. The spacer 78 projects upwardly into the space 30 in the lower slat 22 at its upper end, the spacer 78 contacts the top 24 of the slat 22. The tubular body 68 of the air supply/exhaust conduit 52 extends downwardly through an opening in the top wall 24 of the lower slat 22, then through the center passageway of the tubular spacer 78, and then the opening 80 in the top wall 74 of the manifold 76. An O-ring 82 is positioned between the upper end of spacer 78 and the bottom surface of top wall 24. This O-ring 82 seals against the escape of air from the manifold 76, through the opening 72; through the center of the spacer 78 and between the upper end of the spacer 78 and the top wall 24. An opening the lower end portion of the conduit 52 is internally threaded. An opening 86 is provided in the lower wall 88 of the manifold 76. The threaded shank portion 90 of a bolt 92 is inserted upwardly through the opening 86 and is screwed into the threaded opening 84. A head 94 at the lower end of the bolt 92 includes an annular groove in which an O-ring seal 96 is received. When the bolt 92 is tightened, the seal 96 bears against the lower wall 88 of the manifold 76 and seals against air leakage from the manifold 76 through the opening 86 and between the bolt head 94 and the manifold wall 88. When the bolt 92 is tightened, the flange 66 is drawn down into tight engagement with the lower wall of the bladder 50 where it immediately surrounds the opening through which the tubular body 68 is inserted. A flat 98 is formed on one side of the tubular body 68. A transverse lock pin 100 is inserted through an opening formed in the spacer 78. Its inner portion contacts the flat 98 and prevents spacer 78 from rotating relative to tubular body 66 and vice versa. Radial openings 102 extend through the lower portion 70 of the supply/exhaust conduit 52 and communicate the inside of the manifold 76 with the inside of the conduit 52 and the inside of the inflatable bladder 50.

The manifold 76 extends crosswise of the slats, viz. transverse. This manifold 76 is shown schematically in FIG. 3. An air supply/exhaust line 104 extends to and from a control valve 106. Valve 106 has a first position in which compressed air in line 108 is connected to the line 104 and a second position in which the line 104 is connected to an exhaust line 110. The rest of the air supply/exhaust system is schematically shown in FIG. 3. The particular details of the system are not apart of the invention and so the system will not be described in any further detail.

Figure 13:
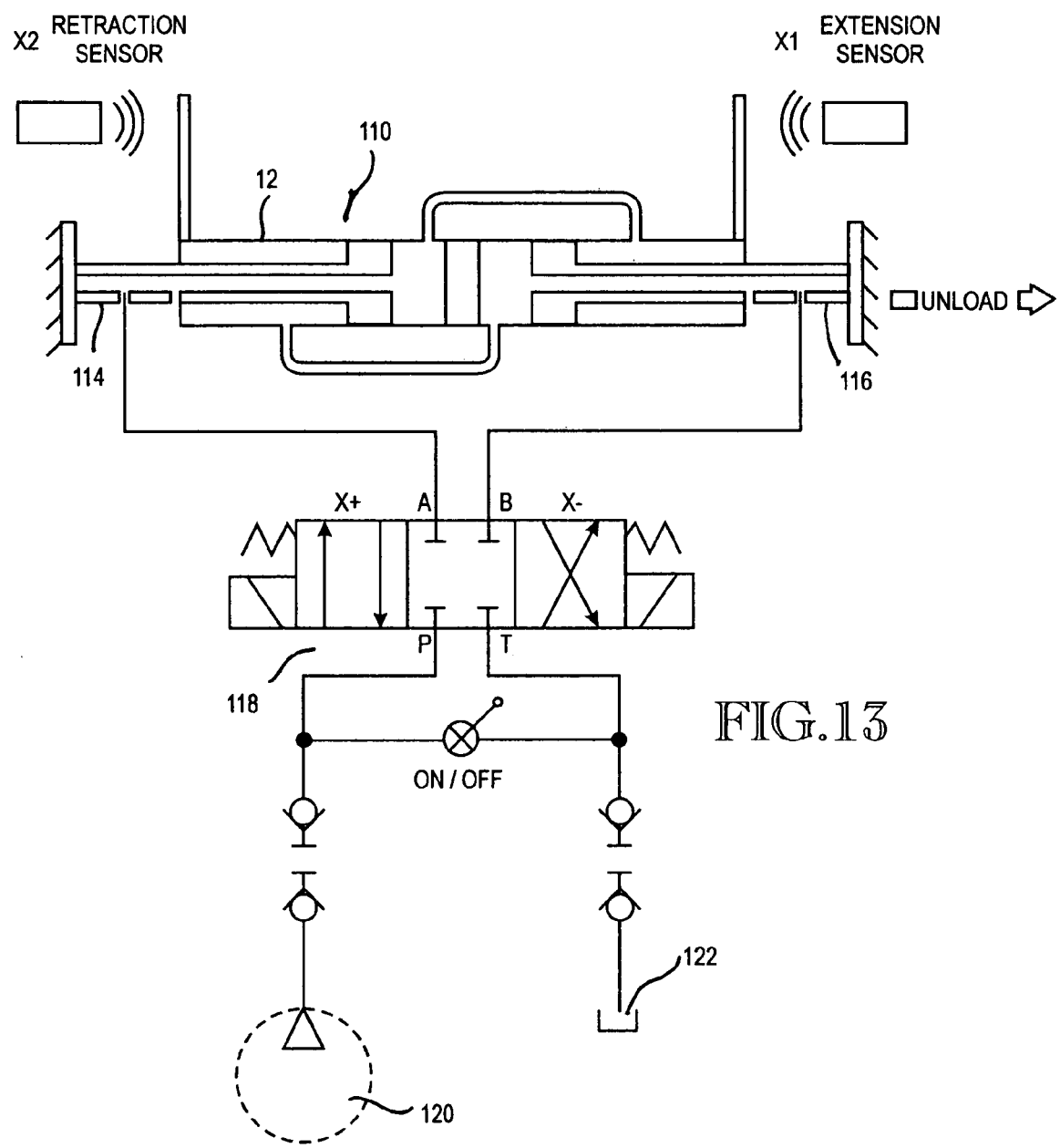
FIG. 13 is a schematic view of the hydraulic fluid supply and control system for reciprocating the conveyor slats.

FIG. 13 is a schematic diagram of the hydraulic drive assembly for reciprocating conveyor slats. A hydraulic cylinder 110, having a movable center portion 112 and fixed end portions 114, 116 is mounted on a frame below the slats. The conveyor slats are connected to the movable portion 112 of the cylinder 110. A reversing valve 118 switches hydraulic fluid pressure between the opposite ends of the cylinder 110, in the manner disclosed in my aforementioned U.S. Pat. No. 5,588,522, with respect to hydraulic drive unit 62 shown in that patent. The switching valve 118 switches hydraulic pressure from a pump 120 back and forth between the conduits A, B. It also switches the term from the conduits A, B to tank 122. References made to the aforementioned U.S. Pat. No. 5,588,522 for a more thorough description of the hydraulic power and control system.

The illustrated embodiment is only and example of the present invention and, therefore, is non-limitive. It is to be understood that many changes in the particular structure, materials and features of the invention may be made without departing from the spirit and scope of the invention. Therefore, it is my intention that my patent rights not be limited by the particular embodiment that is illustrated and described herein, but rather are to be determined by the following claims, interpreted according to accepted doctrines of patent claim interpretation, including use of the doctrine of equivalents.

What is claimed is:

1. In a slat conveyor that includes a plurality of laterally spaced apart lifting slats interposed between laterally spaced apart conveying slats, each said lifting slat comprising:
   a fixed lower slat having a top, a pair of opposite side portions depending from the top and defining a bottom space between them, and laterally outwardly projecting first flanges on said side portions;
   a vertically movable upper slat above the fixed lower slat, said upper slat having a top, laterally spaced apart side portions depending from the top and defining a space between them in which the lower slat is situated, said side portion, of the upper slat including laterally inwardly projecting second flanges;
   said upper slat being movably vertical between a lowered position in which the second flanges are below and are vertically spaced from the first flanges, and a raised position in which the second flanges contact the first flanges and stop any further upward movement;
   an inflatable bladder positioned between the top of the lower slat and the top of the upper slat; and
   an air supply/exhaust conduit extending upwardly through the bottom space of the lower slat, and through an opening in the top of the lower slat, and connecting with the inflatable bladder,
   whereby air delivered through the air supply/exhaust conduit into the bladder will inflate the bladder and push the upper slat upwardly until the first flanges contact the second flanges, and removal of air from the bladder through the air supply/exhaust conduit will allow the upper slat to drop downwardly relative to the lower slat.

2. The slat conveyor of claim 1, wherein the upper slat is an extrusion.

3. The slat conveyor of claim 1, wherein the lower slat is an extrusion.

4. The slat conveyor of claim 3, wherein the upper slat is an extrusion.

5. The slat conveyor of claim 1, wherein the upper slat includes laterally inwardly projecting third flanges that are situated above the first flanges, and wherein when the upper slat is in its lowered position, the third flanges sit down onto the first flanges.

6. The slat conveyor of claim 1, wherein the lower slat includes laterally outwardly projecting fourth flanges below the second flanges, and wherein when the upper slat is in its lowered position the second flanges sit down onto the fourth flanges.

7. The slat conveyor of claim 1, further comprising a tubular manifold extending sideways of the conveyor below the lower slats, and wherein the supply/exhaust conduit is at its lower end connected to the manifold.

8. The slat conveyor of claim 7, comprising a tubular spacer having a lower end in contact with the manifold and an upper end in contact with the top of the lower slat, and wherein the air supply/exhaust conduit extends upwardly from within the manifold, through the tubular spacer, and into the inflatable bladder.

9. The slat conveyor of claim 8, wherein the air supply/exhaust conduit includes an upper end with a laterally outwardly projecting flange, and said flange is located within the inflatable bladder and includes a lower surface that contacts a portion of the bladder that surrounds the air supply/exhaust conduit.

10. The slat conveyor of claim 9, wherein the air supply/exhaust conduit includes an internally threaded lower end portion, and a retaining bolt extends upwardly through an opening in a lower wall of the manifold and screws into the threaded lower end portion of the air supply/exhaust conduit, and when tightened pulls the flange at the top of the air supply/exhaust conduit into tight sealing engagement with the region of the inflatable bladder that surrounds the air supply/exhaust conduit.

11. The slat conveyor of claim 10, wherein the air supply/exhaust conduit has a tubular lower portion within the manifold that includes a sidewall and openings in the sidewall which communicate the interior of the air supply/exhaust conduit with the interior of the manifold.

12. In a slat conveyor that includes a plurality of laterally spaced apart lifting slats having a vertically movable upper portion and a fixed lower base portion, and an inflatable bladder positioned between the upper and lower portions of the lifting slat, an air supply/exhaust system comprising:
   an air supply/exhaust conduit extending upwardly through an opening in the lower portion of the lifting slat and connecting with the inflatable bladder, whereby air delivered through the air supply/exhaust conduit into the bladder will inflate the bladder and push the upper portion of the lifting slat into an upper position and removal of air from the bladder through the air supply/exhaust conduit will allow the upper portion of the lifting slat to drop downwardly relative to the lower portion of the lifting slat.

13. The slat conveyor of claim 12, further comprising a tubular manifold extending sideways of the conveyor below the lifting slats, wherein the supply/exhaust conduit is at its lower end connected to the manifold.

14. The slat conveyor of claim 13, comprising a tubular spacer having a lower end in contact with the manifold and an upper end in contact with the lower portion of the lifting slat, wherein the air supply/exhaust conduit extends upwardly from within the manifold, through the tubular space, and into the inflatable bladder.

15. The slat conveyor of claim 14, wherein the air supply/exhaust conduit includes an upper end with a laterally outwardly projecting flange, and said flanges located within the inflatable bladder and includes a lower surface that contacts a portion of the bladder that surrounds the air supply/exhaust conduit.

16. The slat conveyor of claim 15, wherein the air supply/exhaust conduit includes an internally threaded lower end portion, and a retaining bolt extends upwardly through an opening in a lower wall of the manifold and screws into the threaded lower end portion of the air supply/exhaust conduit, and when tightened, pulls the flange at the top of the air supply/exhaust conduit into tight sealing engagement with the region of the inflatable bladder that surrounds the air supply/exhaust conduit.

17. The slat conveyor of claim 16, wherein the air supply/exhaust conduit has a tubular lower portion within the manifold that includes a sidewall and openings in the sidewall which communicate the interior of the air supply/exhaust conduit with the interior of the manifold.

* * * * *